United States Patent [19]

Okada et al.

[11] Patent Number: 4,636,855
[45] Date of Patent: Jan. 13, 1987

[54] SCRAMBLED TELEVISION SIGNAL RECEIVER SYSTEM

[75] Inventors: Takashi Okada, Yokohama; Takao Mogi, Tokyo; Shinjiro Mino, Yachiyo, all of Japan

[73] Assignee: Sony Corporation, Tokyo, Japan

[21] Appl. No.: 585,174

[22] Filed: Mar. 1, 1984

[30] Foreign Application Priority Data

Mar. 9, 1983 [JP] Japan .................................. 58-38766

[51] Int. Cl.4 ........................................... H04N 7/167
[52] U.S. Cl. .................................... 358/124; 358/121; 358/122; 358/123
[58] Field of Search ............... 358/114, 122, 123, 124, 358/121, 86

[56] References Cited

U.S. PATENT DOCUMENTS

| 3,586,768 | 6/1971 | Ganske | 358/124 |
| 3,641,265 | 2/1972 | Ganske | 358/124 |
| 4,019,201 | 4/1977 | Hartung et al. | 358/124 |
| 4,024,576 | 5/1977 | Hartung et al. | 358/124 |
| 4,283,740 | 8/1981 | Okada | 358/124 |
| 4,533,949 | 8/1985 | Fujimura | 358/122 |

Primary Examiner—Stephen C. Buczinski
Assistant Examiner—Melissa Koltak
Attorney, Agent, or Firm—Lewis H. Eslinger; Alvin Sinderbrand

[57] ABSTRACT

A television signal receiving system for use with a scrambled television signal or a standard television signal includes a recording and reproducing circuit which records and reproduces the received television signal and a monitor for displaying the received or reproduced television signal. A descrambling circuit descrambles the scrambled television signal either as received or reproduced to generate a descrambled television signal when a detector detects the existence of a scrambled television signal and generates a control signal in response thereto. A switch responds to the control signal and automatically supplies to the monitor either the descrambled television signal or the standard television signal according to the type of television signal being received or reproduced.

4 Claims, 4 Drawing Figures

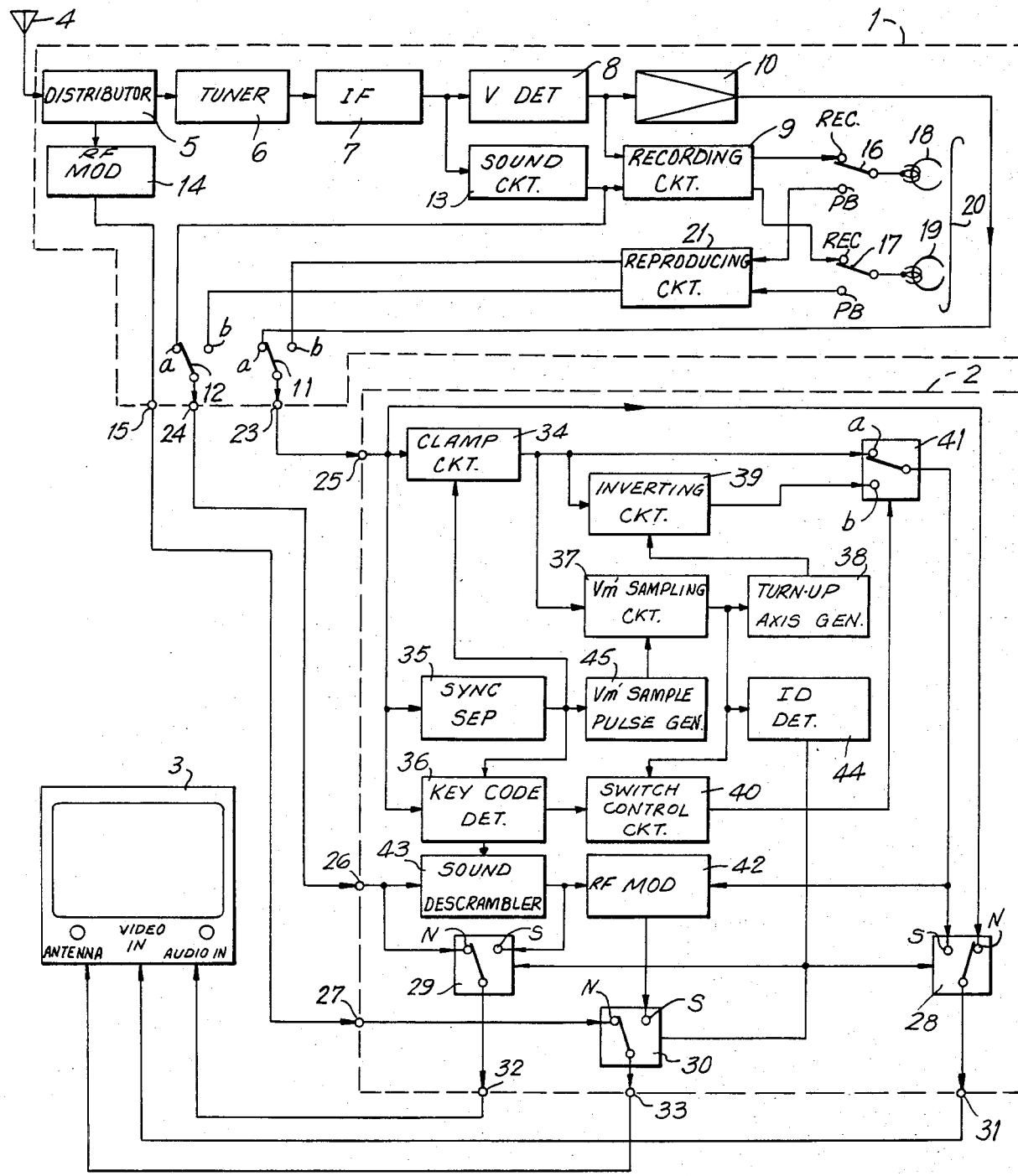

SCRAMBLED TELEVISION SIGNAL RECEIVER SYSTEM

BACKGROUND OF THE INVENTION

1. Field of the Invention

This invention relates to an apparatus for viewing scrambled or unscrambled television signals, and more particularly, is directed to an apparatus which records scrambled or unscrambled television signals and which automatically descrambles recorded scrambled television signals when they are reproduced for viewing.

2. Description of the Prior Art

A television broadcasting system is known in which a broadcasting station transmits a scrambled television signal and the consumer or subscriber receives the signal and descrambles or decodes it by means of a decoder supplied by the broadcasting company in return for a fee.

One example of this kind of scrambled television signal broadcasting system provides a broadcast video signal which is inverted in polarity for a certain period of time. In another example, the polarity of the video signal, as broadcast, is changed in a predetermined order or sequence for a certain period of time. In both cases, a corresponding key code is broadcast for use in a decoder at the receiver for descrambling the signals.

There has been proposed a system in which a scrambled broadcast signal is received and recorded directly in a video tape recorder (VTR). The recorded signal is later played back or reproduced and then descrambled in a decoder for viewing. In this system, the scrambled signals can be broadcast during times other than usual broadcast hours or programming time, for example, after midnight, and the signal is then recorded automatically using a timer. In case an ordinary or unscrambled television signal is recorded, such signal, when being reproduced, bypasses the decoder and is displayed on a television monitor. The decoder in such known system includes a switch to select the signal which is to be supplied to the television monitor. The switch must be manually operated so that a standard or unscrambled television signal is supplied to the television monitor. This arrangement is particularly inconvenient to the viewer, however, since the switch must be changed each time there is a change in the program to be viewed between a scrambled television signal and a standard television signal.

OBJECTS AND SUMMARY OF THE INVENTION

Accordingly, it is an object of the present invention to provide a television receiver system which avoids the aforesaid difficulties.

It is another object of the present invention to provide a television receiver system which can automatically select a standard television signal or a descrambled television signal from a decoder for viewing.

It is another object of the present invention to provide a decoder apparatus which receives either a standard television signal or a scrambled television signal, automatically descrambles the scrambled television signal if the latter is received, and supplies either the standard television signal or the descrambled signal to a television monitor without manual selection by the viewer.

According to one aspect of the present invention, a television signal receiving system for use with a scrambled television signal or a standard television signal comprises recording and reproducing means for recording the received scrambled television signal or standard television signal on a record medium and reproducing the scrambled or standard television signal from the record medium; monitor means for displaying television signals; descrambling means for descrambling the reproduced scrambled television signal and thereby provide a descrambled television signal; detecting means for detecting the reproduced television signal is scrambled and generating a control signal in response thereto; and switch means responsive to the control signal for selectively automatically supplying one of the reproduced descrambled television signal and the reproduced standard television signal to the monitor means.

The above, and other objects, features and advantages of the present invention, will be apparent from the following detailed description of a preferred embodiment when considered in connection with the accompanying drawings.

BRIEF DESCRIPTION OF THE DRAWINGS

FIG. 3 is a schematic block diagram of a television receiver system according to an embodiment of the present invention.

DETAILED DESCRIPTION OF THE PREFERRED EMBODIMENT

Figure 1A:
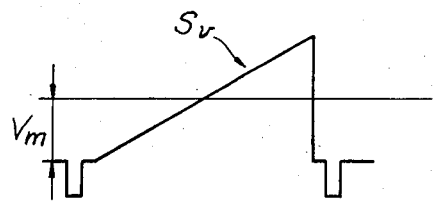
FIGS. 1A and 1B illustrate a standard or unscrambled video signal and a scrambled video signal of a type intended to be used with a system embodying the present invention.
Figure 1B:
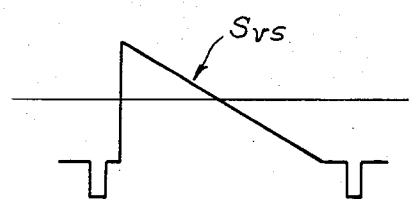

Needless to say, the principal object of a scrambled television broadcasting system is to prevent nonsubscribers from obtaining the benefit or enjoyment of the scrambled transmitted signal without paying the appropriate fee. In FIG. 1A, the video signal $S_v$ of a standard or unscrambled television signal is shown to have a white level, a black level, and a so-called turn-up level $V_m$ which, in the illustrated scrambling method, is the level measured from the standard black level about which the video information is to be inverted. FIG. 1B illustrates a scrambled video signal $S_{vs}$ which has its video information portion inverted across turn-up level $V_m$. Signal $S_{vs}$ of FIG. 1B illustrates an inverted signal in which the horizontal and vertical synchronizing pulses included in the video signal are not inverted. It is to be appreciated that if the horizontal and vertical synchronizing pulses were inverted in the scrambled video signal, it would be difficult to descramble the scrambled signal. According to the scrambling method applied to the video signals of FIGS. 1A and 1B, the transmitted field signals are alternately inverted, i.e., an inverted field signal is followed by a non-inverted field signal. Other patterns of inverting the field signals may be used, for example, two inverted field signals may be followed by a noninverted field signal.

An identification signal and a key code signal are also transmitted along with the scrambled video signal. The identification signal indicates that the video signal then being transmitted or broadcast is scrambled, and the key code signal indicates the pattern of scrambling used in the broadcast. According to the scrambling pattern of FIG. 2, an identification signal ID having a constant level is inserted in the sixteenth horizontal scanning period of the vertical blanking interval. A key code signal is inserted in the seventeenth horizontal scanning period of the vertical blanking interval.

It is to be appreciated that the audio signal accompanying the scrambled video signal can be scrambled as well, and in correspondence to the above-described scrambled pattern, as is known to those of ordinary skill in the art.

Figure 2:
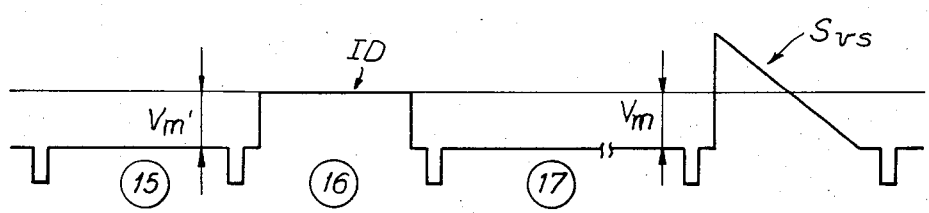
FIG. 2 illustrates a transmitted scrambled television signal for use with an embodiment of the present invention.

In descrambling the scrambled video signals of FIGS. 1 and 2, each level-inverted field is detected and re-inverted so that a descrambled or standard signal is available for viewing. In the illustrated method, a turn-up level used in descrambling the scrambled television signal is generated in the receiver according to the level of a turn-up level inserted in the scrambled video signal prior to broadcasting.

It is to be further appreciated that if the turn-up level varies in the receiver, the accuracy of the inversion of the received signal and of the corresponding descrambled video signal is adversely affected. Such variations in the turn-up level can occur due to fluctuations in the parts or the temperature characteristics of the parts of the decoder or the like.

In order to deal with this problem, it has been suggested that the level $V_{m'}$ of the constant level identification signal ID transmitted in the sixteenth horizontal scanning period be related to a turn-up level $V_m$ used in the coding and decoding apparatus. In FIG. 2, $V_m$ equals $V_{m'}$. Even if the level of the video signal varies in transmission, the turn-up level based on signal $V_{m'}$ and used at the receiver for descrambling the received scrambled signal provides accurate descrambling because the level of the identification signal ID, transmitted with the video signal and used for determining the turn-up level, varies with the video signal.

Referring now to FIG. 3, it will be seen that the television receiver system according to an embodiment of this invention is there shown to comprise a video tape recorder (VTR) 1, a decoder 2, and a television monitor 3. An antenna 4 receives broadcast standard television signals or scrambled television signals and supplies them through a distributor 5, a tuner 6 and an intermediate-frequency amplifier 7 to a video detector 8. Following demodulation in video detector 8, the video signal is fed to a recording circuit 9 and through an appropriate buffer amplifier 10 to a fixed terminal a of a switch 11. The signal from intermediate-frequency amplifier 7 is also supplied to an audio circuit 13, in which the audio signal is demodulated and then fed to recording circuit 9 as well as to a fixed terminal a of a switch 12.

The distributed signal from distributor 5, which may include a signal splitter, is converted to a frequency of a locally vacant or unused channel, typically channel 2 or 3, in an RF modulator 14 and fed to an output terminal 15 of VTR 1.

The video signal from recording circuit 9 is supplied to an REC (record) terminal of a switch 16 which is connected to a rotary video magnetic head 18 for recording the processed video signal on a magnetic tape 20. Similarly, the processed audio signal from recording circuit 9 is supplied to an REC terminal of a switch 17 which is connected to an audio magnetic head 19 for recording on magnetic tape 20.

When it is desired to reproduce the audio and video signals recorded on magnetic tape 20, switches 16 and 17 are changed over to engage respective terminals PB (playback) and the reproduced video and audio signals are fed from the respective magnetic heads 18 and 19 to reproducing circuit 21. The reproduced video and audio signals are then fed to fixed terminals b of switches 11 and 12, respectively, which are, in turn, connected to output terminals 23 and 24 of the VTR. It is to be appreciated that when received broadcast television signals are scrambled, such signals are recorded on magnetic tape 20 in a scrambled fashion, so that the subsequently reproduced video and audio signals from magnetic tape 20 are also scrambled. In a similar fashion, received standard television signals are recorded as standard television signals on magnetic tape 20, that is, in an unscrambled form, and remain unscrambled when subsequently reproduced.

The video and audio output signals of video tape recorder 1 made available at output terminals 23 and 24, respectively, are supplied through suitable connecting cables to respective input terminals 25 and 26 of decoder 2. The output terminal 15 of VTR 1 is similarly connected to an input terminal 27 of decoder 2.

The input terminals 25, 26 and 27 of decoder 2 are connected to terminals or fixed contacts N of switches 28, 29 and 30, respectively, which also have respective fixed contacts S and movable contacts connected to decoder output terminals 31, 32 and 33, respectively. Input terminal 25 is also shown to be connected to a clamp circuit 34, a horizontal and vertical synchronizing signal separating circuit 35, and a key code detecting circuit 36. The output of clamp circuit 3 is connected to a $V'_m$ reference level sampling circuit 37 which, in turn, controls a turn-up axis generator 38 for supplying a turn-up level signal to an inverting circuit 39 which also receives the output of clamp circuit 34.

The synchronizing signals from separating circuit 35 are applied to clamp circuit 34 and key code detecting circuit 36 for timing the operations thereof, and the output of key code detecting circuit 36 is applied to a switch control circuit 40 which also receives the output of sampling circuit 37. The output of circuit 40 controls a switch 41 which has input terminals or contacts a and b connected to the outputs of clamp circuit 34 and inverting circuit 39, respectively. The movable contact or output of switch 41 is connected to contact S of switch 28 and also to an input of an RF modulator 42. An audio or sound descrambler 43 is connected to input terminal 26, and the output of descrambler 43 is applied to another input of RF modulator 42 and to contact S of switch 29. Input terminal 26 is also connected directly to contact N of switch 29. The output of RF modulator 42 is connected to contact S of switch 30, and contact N of the latter switch is connected directly to input terminal 27. An identification signal detector 44 is also connected to the output of sampling circuit 37 and, in response thereto, controls switches 28, 29 and 30. Finally, a sample pulse generator 45 is included in decoder 2 and, in response to the synchronizing signals from separating circuit 35, provides a suitably timed sampling pulse to sampling circuit 37.

The output terminals 31, 32 and 33 of decoder 2 are shown to be respectively connected to "VIDEO IN", "AUDIO IN" and antenna "ANT" terminals on the monitor 3.

The above described system embodying this invention operates as follows:

When an ordinary or standard television signal, that is, one which is not scrambled, is being received by video tape recorder 1, switches 11 and 12 may be engaged with their respective terminals a so that the video and audio signals are fed directly to the appropriate output terminals 23 and 24 without having been recorded on magnetic tape 20. Of course, when a standard television signal is being received from antenna 4, the video and audio signals thereof may also be supplied through switches 16 and 17 (positioned as shown) to heads 18 and 19 for recording on tape 20. Subsequently, with switches 16 and 17 changed-over to engage their contacts PB and with switches 11 and 12 changed-over to engage their terminals or contacts b, the recorded standard video and audio signals can be reproduced from tape 20 by heads 18 and 19 and supplied through reproducing circuit 21 and switches 11 and 12 to output terminals 23 and 24, respectively. In either case, the video and audio output signals at terminals 23 and 24 of video tape recorder 1 are fed therefrom to the respective input terminals 25, 26 of decoder 2.

So long as the video signal received at input terminal 25 is not scrambled, that fact is detected or sensed by identification signal detector 44 which thereby conditions switches 28,29 and 30 to engage their respective N contacts, as shown on FIG. 3, with the result that the video and audio signals applied to input terminals 25 and 26, respectively, are passed directly through switches 28 and 29, respectively, in decoder 2 to output terminals 31 and 32. Thus, the video and audio signals applied from terminals 31 and 32 to the "VIDEO IN" and "AUDIO IN" terminals of monitor 3 are not decoded or descrambled in decoder 2 so long as the received or reproduced television signal was not earlier scrambled.

Further, when a standard television broadcast signal is being received by antenna 4 and the antenna terminal "ANT" of monitor 3 is used, modulator 14 converts the frequency of the received signal to that of the vacant television channel and the frequency-converted signal is supplied to terminal "ANT" through terminals 15 and 27, contact N of switch 30 and output terminal 33 of decoder 2.

When a scrambled television broadcast signal is received by antenna 4, it may be recorded on tape 20 in the same fashion as described above for an ordinary or standard television signal. When a scrambled television signal recorded on tape 20 is later reproduced, switches 16 and 17 are changed-over to engage their contacts PB and switches 11 and 12 are changed-over to engage their respective contacts b. The reproduced scrambled video signal from reproducing circuit 21 is supplied through switch 11 and output terminal 23 to input terminal 25 of decoder 2, and the reproduced scrambled audio signal from reproducing circuit 21 is supplied through switch 12 and output terminal 24 to input terminal 26 of decoder 2. The scrambled video signal is supplied to clamping circuit 34 which clamps its pedestal level. The scrambled video signal is also supplied to synchronizing signal separating circuit 35 in which horizontal and vertical synchronizing signals are separated, and to key code detector 36 which is made operative to detect a key code signal included in the video signal by the horizontal and vertical synchronizing signals from sync signal separating circuit 35.

The clamped video signal from circuit 34 is sampled by circuit 37 in response to a sampling pulse from generator 45 under the control of the separated horizontal and vertical synchronizing signals from separating circuit 35. More particularly, pulse generator 45 is operative to provide a sampling pulse during each interval in which the identification signal ID would be included in the scrambled television signal. Thus, for the example illustrated on FIG. 2, generator 45 provides a sampling pulse during the sixteenth horizontal period of the vertical blanking period, at which time circuit 37 is made to sample the clamped video signal from circuit 34. Turn-up axis generator 38 responds to the sampled signal from circuit 37 to generate a turn-up level signal which is supplied to inverting circuit 39 so that the latter turns-up or inverts the clamped video signal about the appropriate turn-up level. The clamped video signal, as derived from circuit 34, and the inverted video signal from circuit 39 are received at contacts a and b, respectively, of switch 41, and the latter is controlled to pass either the output of clamping circuit 34 or the output of inverting circuit 39 in accordance with the pattern with which the video signal is selectively inverted in the scrambled television signal.

As previously described, in the example of the invention being here considered, the scrambled television signal has its video signal inverted in alternate fields, and this pattern is indicated by the key code which is derived by detector 36 from the scrambled video signal applied to input terminal 25 when detector 36 is suitably made operative by the horizontal and vertical synchronizing signals from separator 35. Switch control circuit 40, upon being made operative by the signal ID derived from sampling circuit 37, provides a switch control signal corresponding to the key code from detector 36, and which is applied to switch 41 so that the latter engages its contact a, as shown on FIG. 3, during each field in which the video signal is not inverted, and switch 41 is made to engage its contact b during each field in which the video signal is inverted in the scrambled television broadcast signal. As a result of the foregoing, in the output of switch 41, only the fields of the video signal which were inverted in the scrambled television broadcast signal are re-inverted.

Further, identifying signal detector 44 is made operative, in response to the identifying signal ID appearing in the output of sampling circuit 37 for indicating the presence of a scrambled television signal, to provide a switch control signal by which switches 28,29 and 30 are changed-over from engagement with their normal contacts N to engagement with their scrambled signal contacts S. Thus, the unscrambled television signal appearing at the output of switch 41 and applied to the contact S of switch 28 is applied through the latter and output terminal 31 to the "VIDEO IN" terminal of monitor 3.

Simultaneously with the above described processing or decoding of the scrambled video signal reproduced from tape 20, the reproduced scrambled audio signal applied to input terminal 26 is descrambled in sound or audio descrambler 43 in accordance with the corresponding scrambling pattern obtained from key code detector 36, and the resulting descrambled audio signal is applied to RF modulator 46 and also to the contact S of switch 29. As earlier noted, when identifying signal detector 44 detects the presence of an identifying signal ID in the output of sampling circuit 37, that is, when a scrambled television signal is being reproduced, the output of detector 44 also changes over switches 29 and 30 to engage their respective contacts S. Thus, while a scrambled television signal is being reproduced, the descrambled audio signal is applied from the output of audio descrambler 43 through switch 29 and output terminal 32 to the "AUDIO IN" terminal of monitor 3. Moreover, the descrambled video signal from the output of switch 41 and the descrambled audio signal from descrambler 43 are converted, in modulator 42, to the frequency for the vacant TV channel with which antenna input "ANT" is associated, and the frequency converted signal is supplied through switch 30 and output terminal 33 of decoder 2 to the input terminal "ANT" when the latter is in use.

It will be appreciated that, while a scrambled television broadcast signal is being received by antenna 4 and recorded on tape 20 in VTR 1, as previously described, decoder 2 may be simultaneously operative to descramble the signal which is being recorded for simultaneously monitoring the same on monitor 3. More particularly, with switches 16 and 17 in the positions shown on FIG. 3 for recording the video and audio signals of the scrambled television broadcast signal on tape 20, switches 11 and 12 may be manipulated to engage their respective contact a, as also shown on FIG. 3. In such case, the scrambled video signal is passed from amplifier 10 through switch 11 and output terminal 23 of the VTR to the input terminal 25 of decoder 2, while the scrambled audio signal is passed from sound circuit 13 through switch 12 and output terminal 24 to the input terminal 26 of decoder 2. The decoder 2 acts on the scrambled video and audio signals applied to terminals 25 and 26, respectively, in the same manner as described above in respect to the scrambled signals being reproduced from tape 20, with the result that decoded or descrambled video and audio signals are passed from output terminals 31 and 32 to the "VIDEO IN" and "AUDIO IN" terminals of monitor 3, or, if the antenna input terminal "ANT" of monitor 3 is being used, a descrambled television signal frequency converted to the frequency corresponding to the vacant TV channel is obtained from output terminal 33 of the decoder.

Although the embodiment of this invention illustrated on FIG. 3 employs an identification signal detector 44 for changing-over switches 28,29 and 30 to engage the contacts S when the identification signal ID is detected in the output of sampling circuit 37, it will be appreciated that the change over of switches 28,29 and 30 between their respective contacts N and S could be suitably effected instead in response to the key code included in the scrambled television broadcast signal and detected by key code detector 36. In either case, it will be seen that decoder 2 automatically detects or senses when the received broadcast or reproduced television signal is scrambled and, in response to such detection, suitably conditions switches 28,29 and 30 for supplying to the monitor 3 either the unscrambled or standard television signal being received or reproduced, or the descrambled version of the scrambled television signal being received or reproduced.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope and spirit of the invention as defined in the appended claims.

What is claimed is:

1. Apparatus for viewing a television signal having video and audio components which may be received in scrambled condition or in standard condition, comprising:
    video tape recorder means for recording said television signal as received and for reproducing the recorded television signal, said video tape recorder means having a first video output terminal, a first audio output terminal and a first RF output terminal;
    decoder means for descrambling the reproduced television signal when the latter has been received in said scrambled condition to generate a descrambled television signal which is in said standard condition, said decoder means including a first video input terminal, a first audio input terminal and a first RF input terminal adapted for connection to said first video output terminal, said first audio output terminal and said first RF output terminal, respectively, of said video tape recorder means, video descrambling means for descrambling scrambled video signals supplied from said first video input terminal and having an output, audio descrambling means for descrambling scrambled audio signals supplied from said frist audio input terminal and having an output, detecting means for detecting when the recorded television signal is in said scrambled condition in said video and audio components and generating a control signal in response thereto, RF modualtor means supplied with said outputs of said video descrambling means and said audio descrambling means and producing an RF television signal as an output, a second video output terminal, a second audio output terminal and a second RF output terminal, and a plurality of switching means for automatically and selectively connecting said second video, audio and RF output terminals of said decoder means to said first video, audio and RF input terminals thereof, respectively, or to said outputs of said video descrambling means, said audio descrambling means and said RF modulator means, respectively; and
    monitor means for displaying the television signal in said standard condition, said monitor means having a second video input terminal, a second audio input terminal and a second RF input terminal respectively adapted for connection to said second video, audio and RF output terminals, respectively, of said decoder means.

2. Apparatus as in claim 1; wherein said television signal in scrambled condition includes an identification signal; and said detecting means detects said identification signal to generate said control signal.

3. Apparatus as in claim 1; wherein said television signal in scrambled condition includes a key code signal for use in descrambling said television signal in scrambled condition; and wherein said detecting means includes means detecting said key code signal, and means controlling said descrambling means in response to the detected key code signal.

4. Apparatus for viewing a television signal which may be received in scrambled or standard condition, said television signal in scrambled condition including a scrambled video signal having an inverted video signal portion and an uninverted video signal portion, a scrambled audio signal and a key code signal, said apparatus comprising:
    recording and reproducing means for recording the television signal as received and for reproducing the recorded television signal;
    monitor means for displaying the television signal in said standard condition thereof;
    descrambling means for descrambling the reproduced television signal when the latter has been recorded in said scrambled condition, thereby to generate a descrambled television signal which is in said standard condition, said descrambling means including video signal descrambling means for descrambling said scrambled video signal to generate a descrambled video signal and audio signal descrambling means for descrambling said scrambled audio signal to generate a descrambled audio signal, said video signal descrambling means including inverting means for reinverting said inverted video signal portion, switch control means responsive to detection of said key code for generating a switching signal corresponding to each said inverted video signal portion, and descrambler switch means responsive to said switching signal for alternatively supplying said uninverted video signal portion and said reinverted video signal portion as said descrambled video signal;

detecting means for detecting when the recorded television signal is in said scrambled condition and generating a control signal in response there to; and switch means responsive to said control signal for automatically and selectively supplying to said monitor means said descrambled television signal and said television signal reproduced in said standard condition; and wherein each said inverted video signal portion has its white and black levels inverted across a turn-up level; and wherein said video signal descrambling means includes sampling means for sampling said video signal in scrambled condition to identify said turn-up level, and turn-up signal generating means for generating a turn-up axis signal corresponding to the identified turn-up level; and further wherein said inverting means receives said turn-up axis signal for reinverting said white and black levels of each said inverted video signal portion about the level of said turn-up axis signal.

* * * * *